(12) United States Patent
Neystadt et al.

(10) Patent No.: US 11,914,461 B1
(45) Date of Patent: Feb. 27, 2024

(54) ORGANIZATION SEGMENTATION FOR ANOMALY DETECTION

(71) Applicant: VARONIS SYSTEMS, INC., New York, NY (US)

(72) Inventors: John Eugene Neystadt, Kfar-Saba (IL); Evgeny Gilgurt, Ramat-Gan (IL); Igor Grossman, Even-Yehuda (IL); Ori Katz, Kiryat Ono (IL)

(73) Assignee: VARONIS SYSTEMS, INC.

( * ) Notice: Subject to any disclaimer, the term of this patent is extended or adjusted under 35 U.S.C. 154(b) by 0 days.

(21) Appl. No.: 17/943,230

(22) Filed: Sep. 13, 2022

(51) Int. Cl.
*G06F 11/07* (2006.01)
*G06F 11/34* (2006.01)

(52) U.S. Cl.
CPC ...... *G06F 11/0781* (2013.01); *G06F 11/0793* (2013.01); *G06F 11/3447* (2013.01)

(58) Field of Classification Search
CPC ............ G06F 11/0781; G06F 11/0793; G06F 11/3447
See application file for complete search history.

(56) References Cited

U.S. PATENT DOCUMENTS 11,372,705 B1 * 6/2022 Minarik ............ G06F 11/3409
11,593,669 B1 * 2/2023 Chhabra ............... G06F 11/301

OTHER PUBLICATIONS

Tidjon Lionel N et al: "Intrusion Detection Systems: A Cross-Domain Overview", IEEE Communications Surveys & Tutorials, vol. 21, No. 4, Nov. 26, 2019 (Nov. 26, 2019), pp. 3639-3681, XP011758805, DOI: 10.1109/COMST.2019.2922584 [retrieved on Nov. 26, 2019] p. 3639-p. 3672; figures 4-7.

Anum Talpur et al: "Machine Learning for Security in Vehicular Networks: A Comprehensive Survey", arxiv.org, Cornell University Library, 201 Olin Library Cornell University Ithaca, NY 14853, Aug. 19, 2021 (Aug. 19, 2021), XP091026097, the whole document.

* cited by examiner

*Primary Examiner* — Nadeem Iqbal
(74) *Attorney, Agent, or Firm* — Soroker Agmon Nordman Riba

(57) ABSTRACT

A method of detecting and handling anomalies in a network, including, collecting meta-data related to an environment of each organization using the network; wherein each organization deploys one or more computers connected to the network, extracting features from the meta-data, clustering organizations having common features into segments, collecting training data from all organizations, grouping the training data according to the segments, training a model for each segment with event data to detect and handle anomalies, analyzing event data of a segment with a respective model for that segment, providing a decision score responsive to the analyzing; and handling the anomaly based on the decision score.

20 Claims, 3 Drawing Sheets

ORGANIZATION SEGMENTATION FOR ANOMALY DETECTION

FIELD OF THE DISCLOSURE

The present disclosure relates to a system for anomaly detection and more specifically to grouping organizations in segments and analyzing each segment for anomalies independently.

BACKGROUND OF THE DISCLOSURE

Anomaly detection based on logs or telemetry produced by various sensors is a common method for finding security breaches, malfunctions operational anomalies and other events in an enterprise network. Typically the anomalies require human attention and investigation to identify if the anomaly indicates that there is a problem or is the result of legitimate usage.

When dealing with large amounts of data it is complicated to establish a threshold profile for generating alerts. Typically a program that is designed to detect anomalies would require tuning to reach optimal performance. Tuning threshold values too aggressively would lead to many false positives. This requires investing resources to investigate alerts and can potentially hide real events, which are not investigated due to overloads. In contrast thresholds that are too permissive would tend to produce false negatives, missing real events. For example some servers/organizations require frequent password changing, which may cause an increase in user entry of the wrong password. The threshold value should then be adjusted to take into account this feature. Another example is related to the difference between countries hosting the server/organization. Some countries such as China and Russia inspect TLS traffic, causing a lot of TLS connection failures. The threshold value should then take into account the country that is hosting the server/organization.

Tuning thresholds is a complex task therefore vendors try to tune the threshold for all environments. However due to differences between the environments optimal tuning of the threshold for one environment may be far from optimal for others.

SUMMARY OF THE DISCLOSURE

An aspect of an embodiment of the disclosure, relates to a system and method for detecting and handling events in a communication network to determine if the events are anomalies that should be handled by an analyst or standard events that can be ignored. The network is made up from multiple organizations each running a computerized environment including one or more computers. Meta-data of the organizations is used to group organizations having similar features in segments and processing events for each segment independently. A neural network model is trained for each segment and then used to analyze events and determine a decision score indicating how likely the event is an anomaly.

There is thus provided according to an embodiment of the disclosure, a method of detecting and handling anomalies in a network, comprising:

Collecting meta-data related to an environment of each organization using the network; wherein each organization deploys one or more computers connected to the network;
Extracting features from the meta-data;
Clustering organizations having common features into segments;
Collecting training data from all organizations;
Grouping the training data according to the segments;
Training a model for each segment with event data to detect and handle anomalies;
Analyzing event data of a segment with a respective model for that segment;
Providing a decision score responsive to the analyzing; and
Handling the anomaly based on the decision score.

In an embodiment of the disclosure, the trained models are respectively delivered to a local computer belonging to an organization of a respective segment, to process the events of the respective organization. Optionally, the trained models are stored at a multi-tenant server and each model is used to analyze event data for all organizations within the respective segment for which the model was trained to analyze event data. In an embodiment of the disclosure, the meta-data is collected from local logs or data bases at the computers of the organization. Optionally, the meta-data is collected from external sources including Customer Relationship Management (CRM) databases or firmographic databases on computers that refer to the organizations. In an embodiment of the disclosure, the decision score is used to determine if an anomaly is of a high priority and needs to be handled immediately or if it is of low priority and can be handled in due course. Optionally, the trained model increase the decision score if an anomaly occurs simultaneously or within a short time at multiple computers of the same segment. In an embodiment of the disclosure, the clustering is repeated periodically to form a new clustering and the training is repeated every time a new clustering is formed. Optionally, previous events are reevaluated responsive to the new clustering. In an embodiment of the disclosure, the clustering is performed by an algorithm using binary vectors or K-means variation. Optionally, the trained model considers the time interval between events in the same segment in providing the decision score.

There is further provided according to an embodiment of the disclosure, a system for detecting and handling anomalies in a network, comprising:

A central server computer having a processor and memory;
A program that is executed by the central server;
Wherein the program is configured to perform the following:
Collecting meta-data related to an environment of each organization using the network; wherein each organization deploys one or more computers connected to the network;
Extracting features from the meta-data;
Clustering organizations having common features into segments;
Collecting training data from all organizations;
Grouping the training data according to the segments;
Training a model for each segment with event data to detect and handle anomalies;
Analyzing event data of a segment with a respective model for that segment;
Providing a decision score responsive to the analyzing; and
Handling the anomaly based on the decision score.

BRIEF DESCRIPTION OF THE DRAWINGS

The present disclosure will be understood and better appreciated from the following detailed description taken in conjunction with the drawings. Identical structures, elements or parts, which appear in more than one figure, are generally labeled with the same or similar number in all the figures in which they appear, wherein.

DETAILED DESCRIPTION

Figure 1:
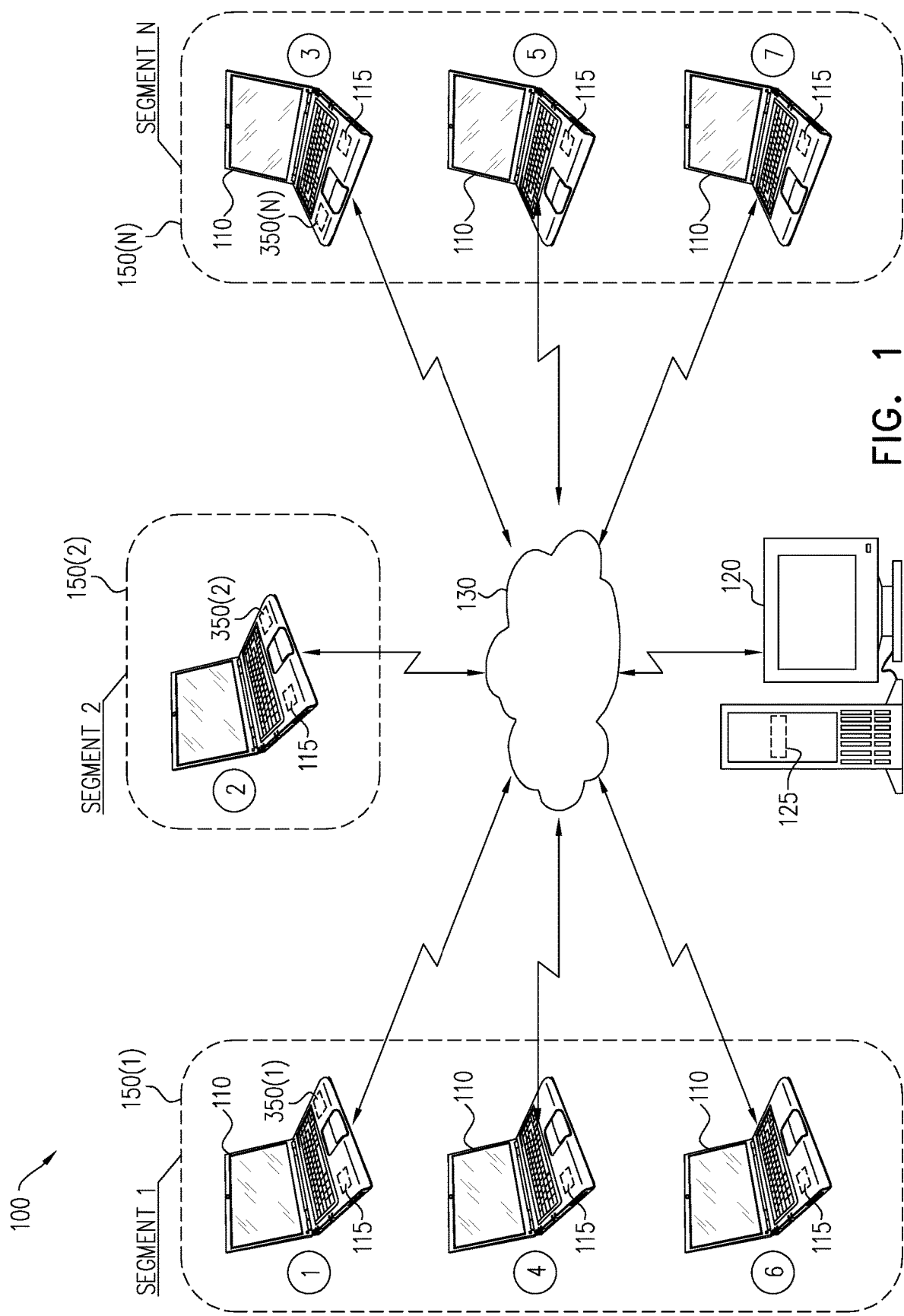
FIG. 1 is a schematic illustration of a system for detecting anomalies in a network, according to an embodiment of the disclosure.

FIG. 1 is a schematic illustration of a system 100 for detecting anomalies in a network 130, according to an embodiment of the disclosure. System 100 includes one or more computers 110 that conunuicate over network 130.

Optionally, each computer 110 may include sensors 115 for detecting anomalies.

The sensors 115 may be software models or hardware elements that provide measurements to computer 110.

For example the anomalies may include:

1) Multiple attempts to login to an application or sever with a wrong password over a short period of time;

2) Repetitive communication failures when communicating with a specific server/application;

3) Excessive downloading from a specific computer or uploading to a specific computer;

4. Receiving erroneous data from sensors 115.

Optionally, each computer 110 identifies events and reports them to a central server 120 or a local analyst for detecting and handling anomalies. In an embodiment of the disclosure, central server 120 includes an analysis program 125 for processing suspected anomalies and deciding if they should be handled as anomalies or not. Optionally, the analysis program 125 uses a neural network that is trained to predict if a suspected anomaly should be considered an anomaly or not.

Initially to improve the accuracy of the anomaly prediction, the computers 110 of the network are grouped into segments 150 (depicted as $150_1$, $150_2$ ... $150_N$), wherein each group includes one or more organizations and each organization includes one or more computers 110 that are associated with the organization. In an embodiment of the disclosure, the neural network and threshold profile for each segment 150 are tuned independently to achieve optimal performance.

Figure 2:
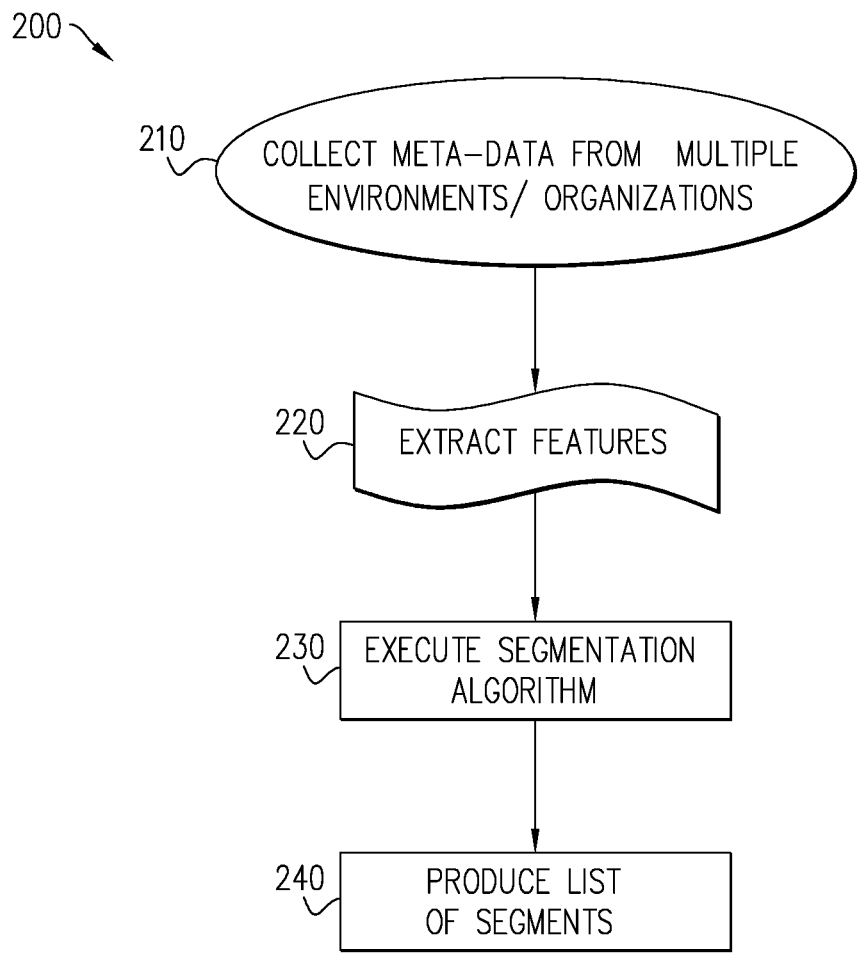
FIG. 2 is a flow diagram 200 of a method of segmenting organizations into groups, according to an embodiment of the disclosure.

FIG. 2 is a flow diagram 200 of a method of grouping organizations into segments, according to an embodiment of the disclosure. Optionally, analysis program 125 on server 120 collects (210) meta-data representing the available organizations and their respective environments. For example the meta-data can be taken from events, logs and databases at each computer 110 belonging to each organization. Alternatively, the meta-data can be taken from external sources such as Customer Relationship Management (CRM) databases (e.g. salesforce) or firmographic databases, such as Bloomberg, which catalog meta-data about companies and refer to the organizations.

After collecting (210) the meta-data the analysis program 125 extracts (220) features for segmentation. The number of features may vary depending on the amount or resolution of the meta-data, the number of organizations and/or the number of desired segments. Optionally, the features can include:

a. The number of domains for each organization:
b. The number of users for each organization;
c. The number of data sources (e.g. file servers) at each organization;
d. The application used by the organization (e.g. SalesForce.com, ServiceNow, Office 365, etc.);
e. The country/geography of the corporate seat of the organization and/or geographic spread of the organization (e.g. in which or how many countries does the organization have branches);
f. The industry dealt with by the organization (e.g. agriculture, finance, healthcare, government, electronics, software, staples);
g. Working hours of the organization (e.g. daytime, nighttime, 24-7, or limited availability; and
h. other features.

In an embodiment of the disclosure, a clustering algorithm is executed (230) by program 125 to group organizations into segments 150. The clustering algorithm may use methods such as binary vectors, K-means variation or other clustering algorithms to group the organizations into segments 150. For example (FIG. 1) Segment $150_1$ may include organizations (1, 4, 6). Segment $150_2$ may include organization (2) and Segment $150_N$ may include organizations (3, 5, 7). Optionally, the number of segments 150 can be fixed or derived from the number of organizations (e.g. Log (no. of organizations)). Likewise the number of organizations in each segment may be equal or some segments may have more organizations than others.

The clustering algorithm produces (240) the list of segments 150 and the organizations/computers 110 that belong to each segment 150. Optionally, clustering may be performed periodically forming a new list of segments. For example clustering may be performed every week, month, 3 months, 6 months or in a longer or shorter period of time. When clustering, an organization may move from one segment to another and be subject to a new threshold profile. In some embodiments, the new clustering may be used to reevaluate previous events with the new threshold profile. Optionally, previously ignored events may be dealt with as anomalies or vice versa.

In an exemplary case, two features are extracted from the meta-data of the segments 150. For example the number of active directory forests and the number of users for each organization. Three clusters may be defined to form 3 segments:

1) Segment 1:
 a) 1 forest;
 b) 1-1000 users;
2) Segment 2:
 a) More than 1 forest;
 b) 1 K-100 K users;
3) Segment 3:
 a) More than 1 forest;
 b) More than 100 K users.

Alternatively, 2 segments may be formed based on the number of active directories or based on the number of users, for example:

Segment 1: 1 forest:
Segment 2: multiple forests;
Or
Segment 1: less than 1000 users;
Segment 2: 1000 users or more.

Figure 3:
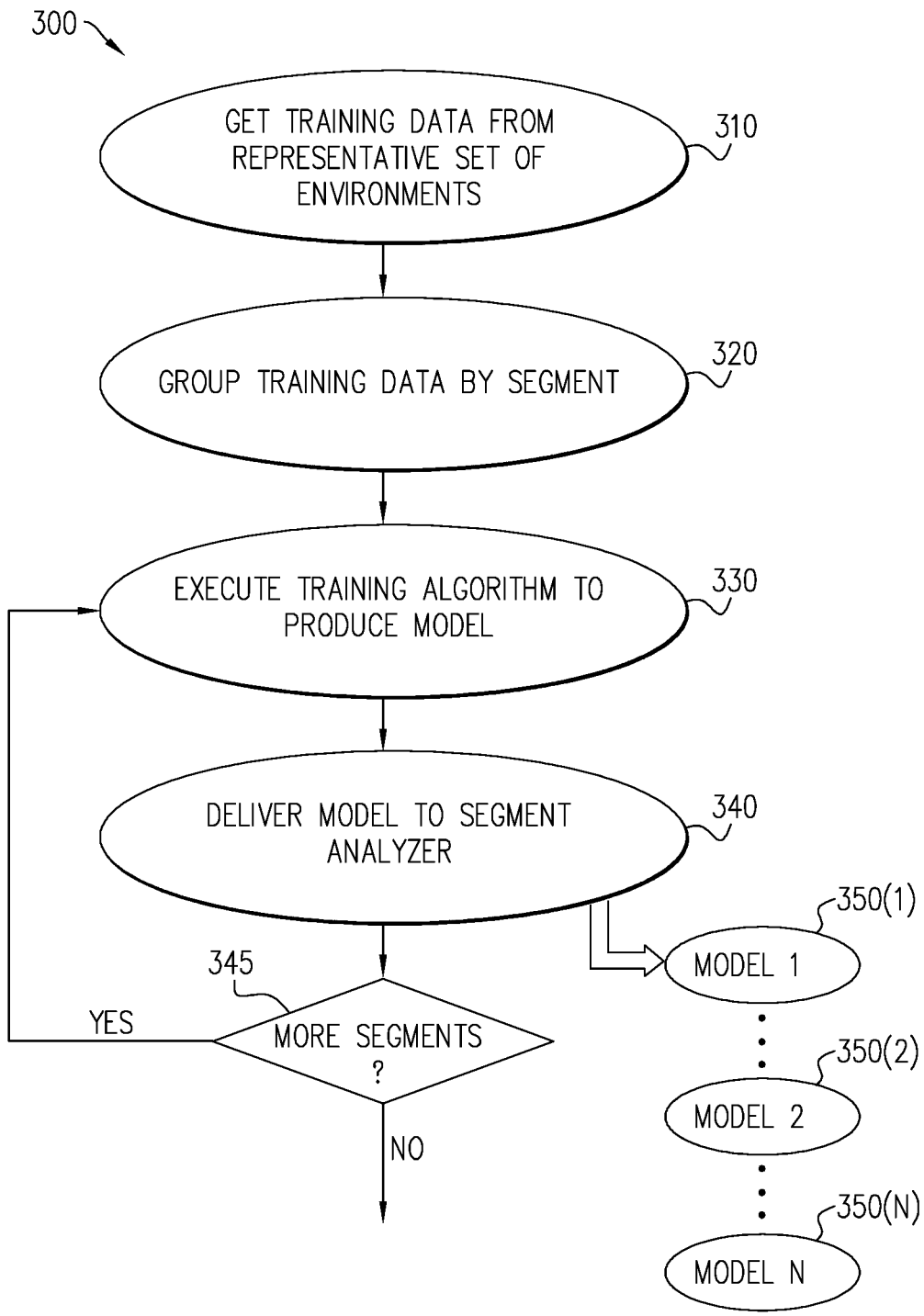
FIG. 3 is a flow diagram 300 of a method of training a model for detecting anomalies in a segment, according to an embodiment of the disclosure.

FIG. 3 is a flow diagram 300 of a method of training a model for detecting anomalies in a segment, according to an embodiment of the disclosure.

In an embodiment of the disclosure, every time segments 150 are redefined program 125 trains models for analyzing the segments 150. The trained models are configured to accept an input and provide a decision or a decision score determining if the input is likely to be an anomaly that should be handled or if it something that can be ignored (e.g. a standard behavior in that segment). Optionally, different trained models provide different results for the same input values, since an anomaly may be the result of standard practice in one segment 150 or a malicious practice in another segment 150.

In an embodiment of the disclosure, training data is collected (310) from logs or telemetry provided by the computers 110 of network 130. Optionally, the training data is processed by an analyst to provide decision scores for training the model. Alternatively, the training data may be processed by previously trained models that were not segmented and further processed by an analyst. The training data is then grouped (320) according to the segment 150 from the list of segments 150 to which the data belongs. For each segment 150 program 125 executes (330) a training algorithm to train a model 350 (depicted as models $350_1$, $350_2$ and $350_N$ in FIG. 1 and FIG. 3) for analyzing events to detect anomalies for the specific segment 150. Optionally, the trained models 350 are then delivered (340) to a local analyst computer 110 that is designated to handle anomalies for a specific organization or segment (e.g. computers 1, 2, 3 for segments 1, 2, N in FIG. 1). Alternatively, the trained models may all be stored at the central server 120, which services computers from all segments and applies the respective trained model for a request from a respective segment. In some embodiments of the disclosure, each organization receives the trained model 350 to deal with events in the organization. Optionally, multiple organizations may share a server computer (multi-tenancy) and the model 350 is delivered to the server computer to service multiple organizations. In some embodiments of the disclosure, the server computer may host multiple models 350 and service organizations from multiple segments with a respective model 350.

In an embodiment of the disclosure, when an event occurs in a specific segment $150_i$, information of the event is provided to model $350_i$ that is trained for the specific segment $150_i$. The model $350_i$ analyzes the anomaly and provides a decision score to determine if the event should be considered an anomaly or not for the specific segment 150. The model $350_i$ then compares the decision score to a segment threshold profile, which is generated as part of the model and generates a decision if the anomaly is standard behavior or needs to be handled by the analyst. Optionally, the score may indicate if the anomaly is of high priority or low priority. A low priority anomaly may be handled by generating an alert that sends notification to a management server (e.g. server 120) or sending a notification (e.g. an email) to an analyst to be handled in due course. A high priority anomaly may trigger an automated remediation action or be handled manually by sending an immediate notification to an analyst to take immediate action.

In an embodiment of the disclosure, the model 350 may compare anomalies relative to anomalies received from other sensors 115 or other computers 110 in the organization. Optionally, an anomaly that occurs simultaneously (or within a short time e.g. within the same minute or hour) in organization computers 110 of the same segment 150 may be considered more severe than an anomaly that occurs only at a single organization computer 110. In contrast anomalies from different segments 150 may not affect each other even if they are similar.

The segment model 350 may consider:

a) The time interval between events in the same segment (detected anomalies);

b) The number of events observed at a single user (e.g. wrong password);

c) The number of events (failed logins) of a given type observed by different users of a segment (e.g. a faulty server);

d) The volume of data transferred by user's, for example as downloads from a specific server or uploads to a specific server.

In an embodiment of the disclosure, program 125 may be stored on a non-transitory computer readable memory and provided to a computer such as central server 120, which includes a processor and memory. Program 125 can be loaded into the memory of the computer and executed by the processor to implement the methods described above for detecting and handling anomalies in a network. Optionally, the non-transitory memory may be a CD, DVD, Diskonkey or other non-volatile memory device.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment are necessary in every embodiment of the disclosure. Further combinations of the above features are also considered to be within the scope of some embodiments of the disclosure.

It will be appreciated by persons skilled in the art that the present invention is not limited to what has been particularly shown and described hereinabove. Rather the scope of the present invention is defined only by the claims, which follow.

We claim:

1. A method of detecting and handling anomalies in a network, comprising:
    collecting meta-data related to an environment of each organization using the network; wherein each organization deploys one or more computers connected to the network;
    extracting features from the meta-data;
    clustering organizations having common features into segments;
    collecting training data from all organizations;
    grouping the training data according to the segments;
    training a model for each segment with event data to detect and handle anomalies;
    analyzing event data of a segment with a respective model for that segment:
    providing a decision score responsive to the analyzing; and
    handling the anomaly based on the decision score.

2. The method of claim 1, wherein the trained models are respectively delivered to a local computer belonging to an organization of a respective segment, to process the events of the respective organization.

3. The method of claim 1, wherein the trained models are stored at a multi-tenant server and each model is used to analyze event data for all organizations within the respective segment for which the model was trained to analyze event data.

4. The method of claim 1, wherein the meta-data is collected from local logs or data bases at the computers of the organization.

5. The method of claim 1, wherein the meta-data is collected from external sources including Customer Relationship Management (CRM) databases or firmographic databases on computers that refer to the organizations.

6. The method of claim 1, wherein the decision score is used to determine if an anomaly is of a high priority and needs to be handled immediately or if it is of low priority and can be handled in due course.

7. The method of claim 1, wherein the trained model increase the decision score if an anomaly occurs simultaneously or within a short time at multiple computers of the same segment.

8. The method of claim 1, wherein said clustering is repeated periodically to form a new clustering and said training is repeated every time a new clustering is formed.

9. The method of claim 8, wherein previous events are reevaluated responsive to the new clustering.

10. The method of claim 1, wherein the trained model considers the time interval between events in the same segment in providing the decision score.

11. A system for detecting and handling anomalies in a network, comprising:
- a central server computer having a processor and a memory;
- a program that is executed by the central server;
- wherein the program is configured to perform the following:
- collecting meta-data related to an environment of each organization using the network; wherein each organization deploys one or more computers connected to the network;
- extracting features from the meta-data;
- clustering organizations having common features into segments;
- collecting training data from all organizations;
- grouping the training data according to the segments;
- training a model for each segment with event data to detect and handle anomalies;
- analyzing event data of a segment with a respective model for that segment;
- providing a decision score responsive to the analyzing; and
- handling the anomaly based on the decision score.

12. The system of claim 11, wherein the trained models are respectively delivered to a local computer belonging to an organization of a respective segment, to process the events of the respective organization.

13. The system of claim 11, wherein the trained models are stored at a multi-tenant server and each model is used to analyze event data for all organizations within the respective segment for which the model was trained to analyze event data.

14. The system of claim 11, wherein the meta-data is collected from local logs or data bases at the computers of the organization.

15. The system of claim 11, wherein the meta-data is collected from external sources including Customer Relationship Management (CRM) databases or firmographic databases on computers that refer to the organizations.

16. The system of claim 11, wherein the decision score is used to determine if an anomaly is of a high priority and needs to be handled immediately or if it is of low priority and can be handled in due course.

17. The system of claim 11, wherein the trained model increase the decision score if an anomaly occurs simultaneously or within a short time at multiple computers of the same segment.

18. The system of claim 11, wherein said clustering is repeated periodically to form a new clustering and said training is repeated every time a new clustering is formed.

19. The system of claim 18, wherein previous events are reevaluated responsive to the new clustering.

20. A non-transitory computer readable medium comprising an executable program configured to perform the method of claim 1.

\* \* \* \* \*